United States Patent
Owens et al.

(10) Patent No.: US 7,881,184 B2
(45) Date of Patent: *Feb. 1, 2011

(54) REVERSE NOTIFICATION TREE FOR DATA NETWORKS

(75) Inventors: Kenneth R. Owens, St. Louis, MO (US); Srinivas V. Makam, Naperville, IL (US); Changcheng Huang, Lisle, IL (US); Vishal Sharma, San Jose, CA (US)

(73) Assignee: Tellabs Operations, Inc., Naperville, IL (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/838,328

(22) Filed: Aug. 14, 2007

(65) Prior Publication Data
US 2009/0147777 A1    Jun. 11, 2009

Related U.S. Application Data

(63) Continuation of application No. 09/693,276, filed on Oct. 20, 2000, now Pat. No. 7,298,693.

(60) Provisional application No. 60/160,840, filed on Oct. 21, 1999, provisional application No. 60/161,277, filed on Oct. 25, 1999, provisional application No. 60/187,798, filed on Mar. 8, 2000.

(51) Int. Cl.
*H04J 1/16* (2006.01)
*H04J 3/14* (2006.01)

(52) U.S. Cl. .......................... 370/216; 370/219; 370/220; 370/227; 370/228

(58) Field of Classification Search ........................ None
See application file for complete search history.

(56) References Cited

U.S. PATENT DOCUMENTS 4,706,080 A    11/1987    Sincoskie
4,825,206 A    4/1989     Brice et al.

(Continued)

FOREIGN PATENT DOCUMENTS

WO    WO 01/29682 A1    4/2001

(Continued)

OTHER PUBLICATIONS

Rosen et al., "Multiprotocol Label Switching Architecture" draft-ietf-mpls-arch-06.txt, http://www3.ietf.org/proceedings/99nov/I-D/draft-ietf-mpls-arch-06.txt, Aug. 1999, 49 pages.

(Continued)

*Primary Examiner*—Ajit Patel
(74) *Attorney, Agent, or Firm*—Hamilton, Brook, Smith & Reynolds, P.C.

(57) ABSTRACT

Recovery time upon the failure of a link or switching system in an asynchronous data network can be minimized if downstream data switches provide upstream messages indicating to upstream switching system that the downstream traffic arrived in tact and was properly handled. Upon this loss or failure of the upstream status message to an upstream switching system, an upstream switching system can reroute data traffic around a failed link or failed switch with a minimal amount of lost data. The upstream status message is conveyed from a downstream switching system to an upstream switching system via a reverse notification tree data pathway.

20 Claims, 2 Drawing Sheets

U.S. PATENT DOCUMENTS

| | | | |
|---|---|---|---|
| 5,138,615 A | | 8/1992 | Lamport et al. |
| 5,241,534 A | | 8/1993 | Omuro et al. |
| 5,245,616 A | | 9/1993 | Olson |
| 5,327,427 A | | 7/1994 | Sandesara |
| 5,371,731 A | | 12/1994 | Pratt et al. |
| 5,436,886 A | | 7/1995 | McGill |
| 5,450,578 A | | 9/1995 | Mackenthun |
| 5,771,227 A | | 6/1998 | Benayoun et al. |
| 5,838,924 A | | 11/1998 | Anderson et al. |
| 5,930,259 A | | 7/1999 | Katsube et al. |
| 5,933,412 A | | 8/1999 | Choudhury et al. |
| 5,991,300 A | | 11/1999 | Tappan |
| 6,034,961 A | * | 3/2000 | Masuo et al. ............... 370/219 |
| 6,055,561 A | | 4/2000 | Feldman et al. |
| 6,065,061 A | | 5/2000 | Blahut et al. |
| 6,111,858 A | | 8/2000 | Greaves et al. |
| 6,167,025 A | | 12/2000 | Hsing et al. |
| 6,215,765 B1 | | 4/2001 | McAllister et al. |
| 6,226,260 B1 | | 5/2001 | McDysan |
| 6,324,161 B1 | | 11/2001 | Kirch |
| 6,339,595 B1 | * | 1/2002 | Rekhter et al. .............. 370/392 |
| 6,452,942 B1 | | 9/2002 | Lemieux |
| 6,463,062 B1 | * | 10/2002 | Buyukkoc et al. ........ 370/395.1 |
| 6,504,963 B1 | | 1/2003 | Fang et al. |
| 6,530,032 B1 | | 3/2003 | Shew et al. |
| 6,532,088 B1 | | 3/2003 | Dantu et al. |
| 6,535,481 B1 | | 3/2003 | Andersson et al. |
| 6,538,987 B1 | | 3/2003 | Cedrone et al. |
| 6,590,893 B1 | | 7/2003 | Hwang et al. |
| 6,594,268 B1 | | 7/2003 | Aukia et al. |
| 6,647,208 B1 | | 11/2003 | Kirby |
| 6,680,943 B1 | * | 1/2004 | Gibson et al. ............... 370/392 |
| 6,697,329 B1 | | 2/2004 | McAllister et al. |
| 6,721,269 B2 | | 4/2004 | Cao et al. |
| 6,728,781 B1 | | 4/2004 | Aguilera et al. |
| 6,813,242 B1 | * | 11/2004 | Haskin et al. ............... 370/229 |
| 6,879,594 B1 | * | 4/2005 | Lee et al. .................... 370/408 |
| 6,895,441 B1 | | 5/2005 | Shabtay et al. |
| 6,944,131 B2 | | 9/2005 | Beshai et al. |
| 6,947,376 B1 | | 9/2005 | Deng et al. |
| 7,298,693 B1 | | 11/2007 | Owens et al. |
| 7,315,510 B1 | | 1/2008 | Owens et al. |
| 2002/0181485 A1 | * | 12/2002 | Cao et al. .................... 370/419 |
| 2008/0095045 A1 | | 4/2008 | Owens et al. |

FOREIGN PATENT DOCUMENTS

WO     WO 01/29685 A1     4/2001

OTHER PUBLICATIONS

Callon, et al., "A Framework for Multiprotocol Label Switching" <draft-ietf-mpls-framework-05.txt>, http:/www3.ietf.org/proceedings/99nov/I-D/draft-ietf-mpls-framework-05.txt, Sep. 1999, 64 pages.
Awduche, et al., "Requirements for Traffic Engineering Over MPLS", http://delivery.acm.org/10.1145/rfc_fulltext/RFC2702/rfc2702.txt?key1=RFC2702&key2=0334318711&c..., Sep. 1999, 26 pages.
Andersson, et al., "LDP Specification" draft-ietf-mpls-ldp-06.txt, http://www3.ietf.org/proceedings/99nov/I-D/draft-ietf-mpls-ldp-06.txt, Oct. 1999, 95 pages.
Jamoussi, Bilel, "Constraint-Based LSP Setup Using LDP" draft-ictf-mpls-cr-ldp-03.txt, http.://www3.ietf.org/proceedings/99nov/I-D/draft-ietf-mpls-cr-ldp-03.txt, Sep. 1999, 34 pages.
Braden, et al., RFC 2205 (RFC2205), "RFC 2205—Resource ReSerVation Protocol (RSVP)—Version 1 Functional Specification", http://www.faqs.org/rfcs/rfc2205.html, Sep. 1997, 74 pages.
Awduche, et al., "Extensions to RSVP for LSP Tunnels", draft-ietf-mpls-rsvp-lsp-tunnel-04.txt, http://www3.ietf.org/proceedings/99nov/I-D/draft-ietf-mpls-rsvp-lsp-tunnel-04.txt, Sep. 1999, 37 pages.
Owens, et al., "Network Survivability Considerations for Traffic Engineered IP Networks", draft-owens-te-network-survivability-01.txt, http: //www3.ietf.org/proceedings/02mar/I-D/draft-owens-te-network-survivability-01..txt, Jul. 2001, 15 pages.
Sharma, et al., "Framework for MPLS-based Recovery", <draft-ietf-mpls-recovery-frmwrk-00.txt>, http://tools.ieft.org/html/draft-ietf-mpls-reocvery-frmwrk-00, Sep. 2000, 30 pages.
Huang, et al., "A Path Protection/Restoration Mechanism for MPLS Networks", <draft-chang-mpls-path-protection-00.txt., http://tools.ietf.org/html/draft-chang-mpls-path-protection-00, Mar. 2000 15 pages.
Huang, et al., "Extensions to RSVP-TE for MPLS Path Protection", <draft-chang-mpls-rsvpte-path-protection-ext-00.txt>, http://tools.ietf.org/html/draft-chang-mpls-rsvptc-path-protection-00, Jun. 2000, 10 pages.
"Synchronous Optical Network (SONET) Transport Systems: Common Generic Criteria", Document No. GR-253, Issue No. 04; Issue Date Dec. 2005, http//telecom-info.telcordia.com/site-cgi/ido/docs2.pl?ID=169750223&page=idosearch&docnum=GR-253, 20 pages.
"SONET Dual-Fed Unidirectional Path Switched Ring (UPSR) Equipment Generic Criteria", GR-1400-CORE, Issue 2, Jan. 1999, SONET UPSR Equipment Generic Criteria Contents, 5 pages.
"SONET Bidirectional Line-Switched Ring Equipment Generic Criteria", GR-1230-CORE, Issue 4, Dec. 1998, SONET BLSR Equipment Generic Criteria Contents, 7 pages.
Downey, "Overview of Tag Switching", IEEE, 1997, pp. 61-66.
Viswanathan, et al. "Evolutioin of Multiprotocol Label Switching", IEEE Communications Magazine, May 1998, pp. 165-173.
Le Faucheur, "IETF Multiprotocol Label Switching (MPLS) Architecture", IEEE, 1998, pp. 6-15.
Dovvney, "Overview of Tag Switching", IEEE, 1997, pp. 61-66.
Viswanathan, et al., "Evolution of Multiprotocol Label Switching", IEEE Communications Magazine, 1998, pp. 165-173.
Le Faucheur,"IETF Multiprotocol Label Switching (MPLS) Architecture", IEEE, 1998, pp. 6-15.
Haskin, et al. "A Method for Setting an Alternative Label Switched Paths to Handle Fast Reroute",http://toos.ietf.org/html/draft-haskin-mpls-fast-reroute-00.txt, Jun. 1999, 10 pages.
Haskin, et al. "A Method for Setting an Alternative Label Switched Paths to Handle Fast Reroute",http://toos.ietforg/html/draft-haskin-mpls-fast-reroute-01.txt, Jun. 1999, 9 pages.
Haskin, et al. "A Method for Setting an Alternative Label Switched Paths to Handle Fast Reroute",http://toos.ietf.org/html/draft-haskin-mpls-fast-reroute-02.txt, Dec. 1999, 5 pages.
Haskin, et al. "A Method for Setting an Alternative Label Switched Paths to Handle Fast Reroute",http://toos.ietforg/html/draft-haskin-mpls-fast-reroute-03.txt, Mar. 2000, 7 pages.
Haskin, et al. "A Method for Setting an Alternative Label Switched Paths to Handle Fast Reroute",http://toos.ietf.org/html/draft-haskin-mpls-fast-reroute-04.txt, May 2000, 7 pages.

* cited by examiner

REVERSE NOTIFICATION TREE FOR DATA NETWORKS

RELATED APPLICATIONS

This application is a continuation application of U.S. application Ser. No. 09/693,276, filed Oct. 20, 2000, which claimed priority to U.S. Provisional Application No. 60/160,840, filed Oct. 21, 1999; U.S. Provisional Application No. 60/161,277, filed Oct. 25, 1999; and U.S. Provisional Application No. 60/187,798, filed Mar. 8, 2000. These prior applications, including the entire written description, claims, and drawing figures, are hereby incorporated into the present application by reference.

TECHNICAL FIELD

This invention relates to data networks. In particular this invention relates to a method and apparatus for providing a pathway through a multi-protocol label-switching (MPLS) network over which messages, which act to trigger the re-routing of data onto an alternate pathway, can be carried.

BACKGROUND

Multi-Protocol Label Switching (MPLS) is a new technology that combines OSI layer 2 switching technologies and OSI layer 3 routing technologies. The advantages of MPLS over other technologies include the flexible networking fabric that provides increased performance and scalability. This includes Internet traffic engineering aspects that include Quality of Service (QoS)/Class of Service (COS) and facilitate the use of Virtual Private Networks (VPNs).

The Internet Engineering Task Force (IETF) defines MPLS as a standards-based approach to applying label switching technology to large-scale networks. The IETF is defining MPLS in response to numerous interrelated problems that need immediate attention. These problems include, scaling IP networks to meet the growing demands of Internet traffic, enabling differentiated levels of IP-based services to be provisioned, merging disparate traffic types onto a single IP network, and improving operational efficiency in a competitive environment.

The key concept in MPLS is identifying and marking IP packets with labels and forwarding them to a modified switch or router, which then uses the labels to switch the 5 packets through the network. The labels are created and assigned to IP packets based upon the information gathered from existing IP routing protocols.

The label stack is represented as a sequence of "label stack entries". Each label stack entry is represented by 4 octets.

The label stack entries appear after the data link layer headers, but before any network layer headers. The top of the label stack appears earliest in the packet, and the bottom appears latest. The network layer packet immediately follows the label stack entry which has the S bit set.

Multi-protocol label switching (MPLS) networks are typically comprised of several packet-based switching systems interconnected by a variety of media (e.g., coaxial or fiber optic cable, unshielded twisted pair or even point-to-point microwave wireless) in a mesh-topology network similar to the public switched telephone network. In such a network, there might be several paths through the network between any two endpoints. MPLS networks carry data as packets wherein each packet includes a label on identifying a switched path through the network. The data label is appended to data packets so as to define a pathway through the network over which the data packets are to be routed.

A problem with any data network, including an MPLS network, is the amount of time required to recover from either a link failure or a switch failure. Empirical data shows that the time required to recover from a network failure can take several seconds to several minutes, an unacceptably long time. A method and apparatus by which the recovery time for a link or switch failure can be reduced to perhaps less than a few hundred milliseconds would be a significant improvement over the prior art fault recovery mechanisms used on MPLS networks to date. A method and apparatus by which a switch over from a working path to a protection path would facilitate MPLS network reliability.

SUMMARY

In an MPLS data network comprised of various transmission media linking various types of switching systems, network fault recovery time is reduced by using a reverse-directed status message that is generated by a data switch that is down-stream from a switching system from which data is received. The reverse-directed or upstream status message is sent over a pre-determined pathway (i.e. through pre-determined switches and/or over pre-determined data links) which originates from a destination switch or node in an MPLS network to upstream switching systems. This so-called reverse notification tree carries a message or messages that are used to indicate the functionality (or non-functionality) of the downstream switch, switches or links of the MPLS network. As long as an upstream MPLS switching system continues to receive the reverse-directed status message from a downstream switch via the reverse notification tree, the switching systems that receive such a message consider the downstream switch and pathways to be in intact. Accordingly, data packets continue to be sent downstream for subsequent

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+Label
|     Label         | Exp |S|     TTL       |Stack
+-+-+-+-+-+-+-+-+-+-+-+-+-+-+-+-+-+-+-+-+-+-+-+-+-+-+-+-+-+-+-+Entry
```

Label: Label Value, 20 bits
Exp: Experimental Use, 3 bits
S: Bottom of Stack, 1 bit
TTL: Time to Live, 8 bits routing and/or processing. If the reverse-directed status message is lost or discontinued, either because of a switch failure or a link failure, the upstream switching system considers the downstream switch or link to have failed and thereafter begins executing a procedure by which data is rerouted over an alternate data path through the network. In the preferred embodiment, the alternate data path over which downstream information is sent is a pre-established protection path and is known to a protection switch in advance, thereby minimizing data loss attributable to the time it might take to calculate a dynamic alternate protection path.

Switches in the network and their interconnections can be modeled using a directed acyclical graph by which a downstream switch knows the identity of the upstream switch to which the failure notice should be sent. In the preferred embodiment, at least one upstream switch routing the MPLS data re-directs data onto a protection path through the network between the same two endpoints by using the reverse notification tree. By way of the reverse notification tree, data loss caused by either a link or switch failure can be minimized by the prompt rerouting of the data through an alternate or recovery data path through the network.

DETAILED DESCRIPTION

Figure 1:
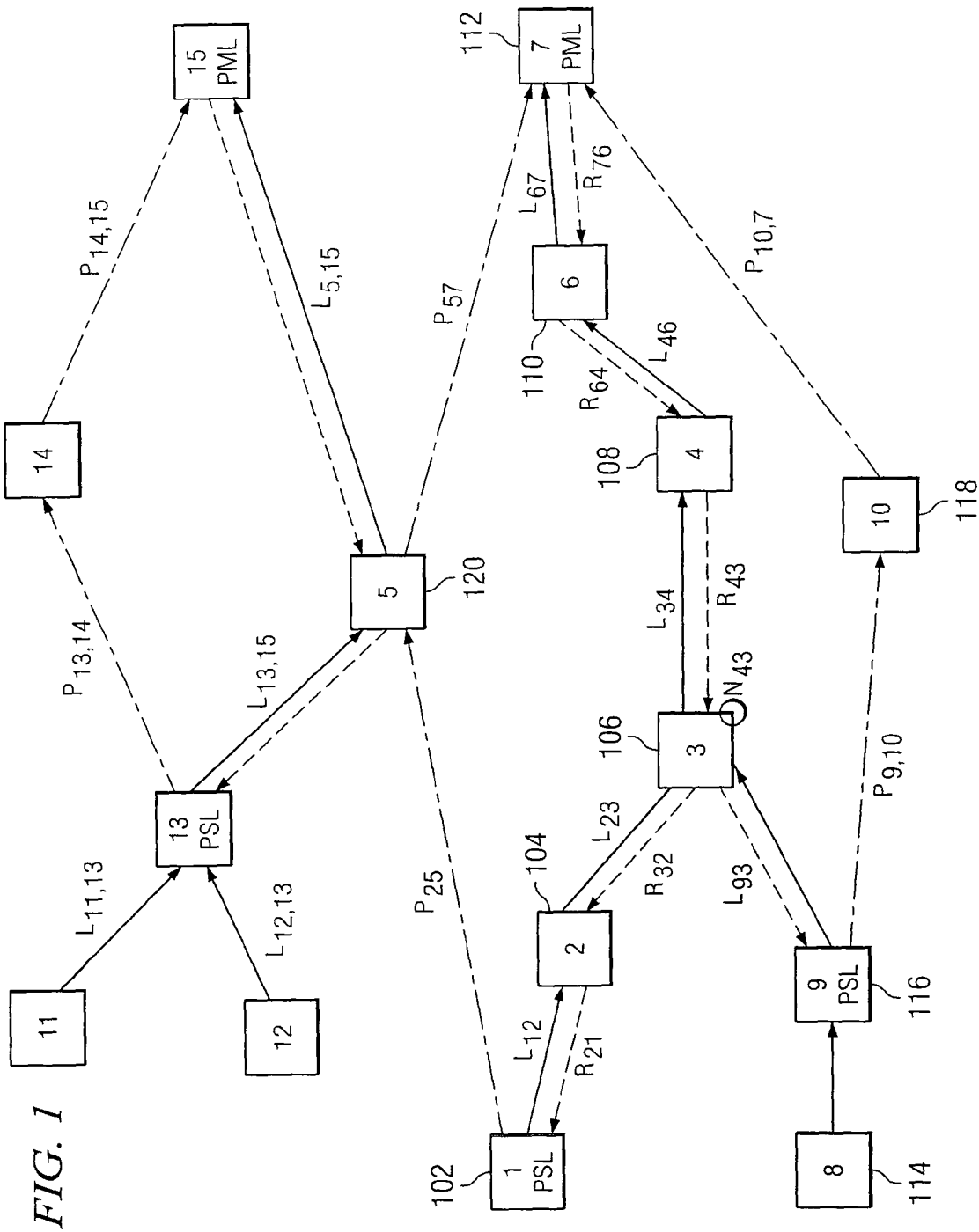
FIG. 1 shows a simplified block diagram of an MPLS protection configuration.

FIG. 1 shows a simplified block diagram of a packetized-data switching network 100. Each of the squares shown in FIG. 1 including boxes represented by reference numerals 102, 104, 106, 108, 110, 112, 114, 116, 118 and 120 represent one or more types of asynchronous switching systems that asynchronously receive data in e.g., packets, cells or frames from an "upstream" switch and route, direct, couple or otherwise send the data onward to another "downstream" switch logically closer to the ultimate destination for the data. By way of example, these switching systems might be interne protocol UP) routers, asynchronous transfer mode (ATM) switches, frame relays switches or other types of packetized-data switching systems implemented to receive packetized data over a transmission line and reroute the data onto one or more output ports to which are connected transmission media coupled to other switching systems.

In FIG. 1, switching system number 1, (identified by reference numeral 102) is coupled to another switching system, no. 2, (represented by reference numeral 104) and switching system no. 5 (represented by reference numeral 120) via links $L_{12}$ and $P_{25}$ respectively. Switching system no. 2 and switching system no. 5 are "downstream" from switch no. 1; switch no. 1 is considered to be "upstream" from switch no. 2 and switch no. 5.

Similarly switching system no. 3, (represented by reference numeral 106) is coupled to switching systems no. 2, no. 4 and no. 9 (represented by reference numerals 104, 108, and 116 respectively) via transmission links $L_{23}$, $L_{34}$, and $L_{93}$ respectively.

In routing data between switch no. 1 (represented by reference numeral 102) and switch no. 7 (represented by reference numeral 112) data might be routed between these two endpoints through a "primary" path that is comprised of links that logically or physically couple switch no. 2, no. 3, no. 4, no. 6 and no. 7 (identified by reference numerals 104, 106, 108, 110 and 112 respectively). The physical or logical links of the primary path between the endpoints which is switch no. 1 and switch no. 7 are represented by the vectors designated $L_{12}$, $L_{23}$, $L_{34}$, $L_{46}$ and $L_{67}$. This path is known in the art as the working or primary path through the network. The links of the various paths shown in FIG. 1 (represented by the vectors L12, L23, L34, L46 and L67), and therefore the paths themselves, might be constructed of direct pathways (e.g., fiber optic cable, coaxial cable, unshielded twisted pairs of copper wires, or microwave radio) between the various switches. Alternate embodiments of the paths or links between switches of the network of FIG. 1 would also include using direct pathways, and intermediate switches or switch networks, (not shown in FIG. 1, but still part of the path or link coupling one or more switching systems to another). By way of example and not of limitation, the data switches shown in FIG. 1 might be IP switches but such IP switches could be linked together using one or more ATM switches or ATM networks.

The MPLS Protection Path

In an MPLS network, there is almost always a "protection" path, which is an alternate path through the network linking two endpoints. The protection path entry and exit points are usually accessible to only protection switches. A protection switch is a switch that can re-route traffic onto a protection pathway. Like the other links described above, a protection pathway can be comprised of direct data paths, but also switches or switching systems, by which data can be sent through a network between two or more endpoints.

In an MPLS network, a protection path is set up using at least one protection switch element so as to be able to carry data from a source to a destination in the event the primary path or switch thereof fails for one reason or another. The operation of a protection switch is shown in FIG. 1 by way of example.

In FIG. 1, a working path between switch no. 1 and switch no. 7 exists through switches no. 1, no. 2, no. 3, no. 4, no. 6, and no. 7 and the links between the switches. A protection path for the portion of the working path that runs through switches no. 2, no. 3, no. 4, no. 6, and no. 7 is the path designated by links $P_{25}$ and $P_{57}$ and which runs through switch no. 5, (identified by reference numeral 120). The protection path extends between endpoint switches no. 1 and no. 7 but through only switch no. 5 (identified by reference numeral 120). Alternate embodiments of a protection path might extend through multiple switches. In the network 100, either a link or switch loss between switch no. 1 and switch no. 7 can be overcome by re-routing traffic for switch no. 2 through switch no. 5 instead. Switch no. 5 then routes the data to switch no. 7. Switch no. 1 (identified by reference numeral 102) is considered to be a protection switch element.

Another working path between switch no. 8 and switch no. 7 of the network 100 (identified by reference numerals 114 and 112 respectively) exists through switches no. 9, no. 3, no. 4, no. 6, and no. 7 (identified by reference numerals 116, 106, 108, and 110 respectively) and the links between them. A protection path for data from switch no. 8 (reference numeral 114) to switch no. 7 (reference numeral 112) through the network 100 exists via switch no. 10 (reference numeral 118) such that if data traffic from switch no. 8 (reference numeral 114) is lost somewhere between switch no. 9 (reference numeral 116) and switch no. 7 (reference numeral 112), switch no. 9 can re-route such data traffic to switch no. 10

(reference numeral 118). Switch no. 10 can then route such data to switch no. 7. Switch no. 9 is therefore considered to be a protection switch element.

If an alternate data path, i.e. a protection path, is predetermined, i.e. set up or established in advance, data loss attributable to a switch or link failure can be minimized. If a protection switch is pre-programmed to re-route data upon its receipt of an appropriate command or signal, the protection switch element can almost immediately start sending data to the proper destination via the protection path.

The Liveness Message

In the event of a pathway failure, such as either a switch failure or a link failure, anywhere along a primary or working path, a protection switch element (PSL), such as switch no. 1 (identified by reference numeral 102) can re-route data traffic through the protection path so as to have the data for the endpoint switch no. 7 delivered as quickly as possible to the endpoint at switch no. 7 (identified by reference numeral 112). The ability to re-route data to a protection path is made considerably more valuable if the decision to switch over to a protection path is based upon an affirmative notice that a switch over is needed. This affirmative notice is in the form of an upstream liveness message, the loss of which indicates a pathway failure. As long as a liveness message is received at an upstream switch from a downstream switch, the upstream switch can assume that the pathway between the two switches is intact and that the downstream switch is functional.

In the event of a switch or link failure anywhere between the path endpoint switches no. 1 and no. 7, data re-routing is accomplished faster by using a reverse-directed status message that is sent backward or upstream toward the protection switch no. 1 (reference numeral 102) by one or more of the switches no. 2, no. 3, no. 4, no. 6, or no. 7 (reference numerals 104, 106, 108, 110, or 112) of the primary pathway, links $L_{12}$, $L_{23}$, $L_{34}$, $L_{46}$ and $L_{67}$. In the preferred embodiment this reverse direction data message is known as a "liveness message" the format of which is a design choice and dependent upon nature of the switches of the network 100, but the function of which is to indicate to upstream switches that the data traffic sent to the downstream switch arrived intact and on time.

The structure of a liveness message will vary depending upon whether the network switches are ATM, IP, Ethernet or other types of switches, as those skilled in the art will recognize. Unlike known fault detection methods, the liveness message is not a copy, or loop-back of the downstream data. The salient aspect of the liveness message is that it is an informational or status message, preferably sent at periodic intervals between adjacent nodes, indicating the operational condition of the switch from which it was sent. Alternate embodiments include sending a liveness message aperiodically. The fact that the liveness message is received at an upstream switch (with respect to the downstream data) is evidence that the link between the switches, over which downstream data would be sent, is intact and that the switch that generated the liveness message is at least somewhat functional.

While the preferred embodiment contemplates that the liveness message is sent upstream from a switch, directly to the switch that sent the downstream data, alternate embodiments of the invention contemplate that the liveness message could be sent between other nodes, or from one switch to an intermediate transfer point, which for purposes of claim construction are considered to be equivalent embodiments. By way of example, with reference to FIG. 1, switch no. 4 (identified by reference numeral 108) will send a liveness message, upstream to switch no. 3 (reference numeral 106) in response to data sent downstream from switch no. 3 to switch no. 4. If the liveness message from switch no. 4 is lost by or not received by switch no. 3, switch no. 3 immediately knows that either the link $L_{34}$ between the two switches failed, or switch no. 4 failed. If switch no. 3 was carrying data from switch no. 9 (reference no. 116) and which is a protection switch element having access to a protection path, switch no. 3 would need to inhibit its liveness message to switch no. 9 or generate an error message to switch no. 9, thereby instructing switch no. 9 to re-route traffic from switch no. 3, to the protection path through switch no. 10 (reference numeral 118).

As for data routed through switch no. 3 that comes from switch no. 2 (reference numeral 104), a liveness message loss from switch no. 4 will require switch no. 3 to inhibit the liveness message to switch no. 2, or send an error message to switch no. 2. This procedure is then repeated to switch no. 1, instructing switch no. 1 to make a protection switch through switch no. 5 (reference no. 120).

Whenever the liveness message is lost, its failure is considered to be indicative of a path failure of either a link or a switch. Still other embodiments of the invention contemplate sending a downstream liveness message, sent from an upstream switch to a downstream switch thereby indicating to a downstream switch that the upstream switch and link are functional.

As set forth above, the format of a liveness message will depend upon the type of switching systems used in the network. IP switches and ATM switches will need to comply with their respective protocols. Alternative embodiments of the invention would certainly contemplate other sorts of liveness messages having different formats with the salient feature of the message being that the message indicates to an upstream switch that downstream directed data messages were received by a downstream switch intact.

In FIG. 1, the links over which reverse notification status messages (i.e. the liveness messages) are sent, are designated by the reverse directed vectors, one of which is shown in FIG. 1 (and identified by reference numeral R76). By way of example if link $L_{67}$ should fail causing a data loss to the endpoint switch no. 7, the corresponding loss of the liveness message ordinarily sent from switch no. 7 to switch no. 6 would provide an indication to switch no. 6 that either the link or the switch no. 7 failed whereupon switch no. 6 would begin notifying the protection switch (switch no. 1) upstream from it by way of a reverse notification message R64 that would be sent to switch no. 4, (represented by reference numeral 108). Similarly, switch no. 4 would thereafter return a reverse notification message R43 to switch no. 3. Switch no. 3 returns another reverse notification message $R_{32}$ to switch no. 2 which then returns a reverse notification message R21 to the origination node 1.

The ultimate destination of the upstream message, and in this case the reverse notification message, is a switching node (i.e. a switch or switching system) that is capable of re-routing downstream traffic, data or messages onto a different path, i.e., a protection path, usually comprised of at least a different transmission route, possibly including a different transmission media as well (coax to fiber; fiber to microwave etc.). Whether the upstream message goes through another switch on its way to the switching node (which has the capability of re-routing data to the protection path) or is directly sent to the switching node from a downstream switch around an intermediate switch (for example, sending a liveness message directly from switch 6 to switch 1) would still provide equal functionality in that the switching node will eventually receive notification that it needs to re-route traffic, data or message onto the protection path. Sending the aliveness message directly to the protection switch or routing the aliveness message via intervening switches are considered to be equivalent embodiments for purposes of claim construction.

Inasmuch as switch no. 1 in FIG. 1 is designated as a "protection switch element" meaning that it is coupled to and capable of routing data onto a protection path P25, the protection switch element 1 (identified by reference numeral 102) reroutes traffic to switch no. 7 via a protection path designated by P25 and P57 and that runs through switch no. 5 (identified by reference numeral 120).

In the preferred embodiment, the switches of the network maintain tables of network switches upon which incoming data is received and a table of network switches to which outgoing data is routed. By keeping a record of where outgoing data from a switch originates from, it is possible for a switch of the network 100 to promptly notify an upstream switch of a downstream link or switch failure.

In the process described above, each of the switches of the network sequentially notifies at least one switch upstream from it. Alternate (and for purposes of claim construction, equivalent) embodiments of the invention could certainly provide upstream notification messages directly from any downstream switch to every other upstream switch in a pathway. In such an embodiment, switch no. 6 might send a reverse notification message directly to the protection switch element 1 via a direct link thereby notifying the protection switch to immediately reroute data to the protection path $P_{27}$ and $P_{57}$ via switch no. 5. Switch no. 6 might also send a reverse notification (liveness) message to the other switching systems of the network as well.

The Reverse Notification Tree

The implementation of the upstream notification message, and its conveyance upstream to a protection switch element, is enabled by using an upstream pathway denominated herein as a reverse notification tree or "RNT." The RNT is an "upstream" signal pathway that allows messages from a protection path end point to be sent "upstream" to one or more protection path (and working path) starting point switches, nodes or starting points. In the preferred embodiment, the RNT passes through the same switches and over or through the links that comprise the working path (albeit over different transmission media) and for claim construction purposes the RNT can be considered to be "coincident" with the working path. Alternate embodiments of the invention would include a reverse notification tree that runs through one or more switches or nodes that are not part of the working path, or which are only partly "coincident." For claim construction purposes, a "coincident" RNT includes RNTs in MPLS networks wherein the working path is a so-called point to multipoint network (in which case the coincident RNT would be a multipoint to point pathway) as well as RNTs in MPLS networks wherein the working path is a multi point to point network, in which case the coincident RNT would be a multi point to point network.

For purposes of claim construction, in this disclosure, the notification messages as well as the so-called liveness messages are both carried on the reverse notification tree and are both considered herein to be a "first message" as well as a "first data message."

With respect to FIG. 1, node 7, identified by reference numeral 112, is the RNT starting point or head end. Nodes 1 and 9, which are identified by reference numerals 102 and 116, are the end points of the RNT and to which upstream protection switch messages would be sent from any node or switch between nodes 1, 9, and 7. Intervening nodes 3, 4, and 6, identified by reference numerals 106, 108, and 110 respectively, are constituent elements or parts of the RNT.

The RNT can be established in association with the working path(s) simply by making each switching system along a working path "remember" its upstream neighbor (or the collection of upstream neighbors whose working paths converge at a network switching element and exit as one). A table or other data structure stored in memory (such as RAM, ROM, EEPROM, or disk) of the switches of the paths can be configured to store data identifying switches coupled to a switching system in, or part of a working path as well as a protection path.

With respect to the network shown in FIG. 1, Table 1 below shows that incoming or "Ingress" RNT messages to switch no. 3 from switch no. 4 are labeled "N43" and that these messages arrive at switch no. 3 from switch no. 4 at an inbound or "Ingress" interface 134 (not shown in FIG. 1). Because switch no. 3 receives downstream messages from two (2) different switches, (i.e. switch no. 2 and switch no. 9) both of these two upstream switches must be sent an upstream notification therefore requiring two separate upstream messages from switch no. 3. Upstream RNT messages to switch no. 2 are labeled "N32" and appear or are sent from interface 123. Upstream RNT messages to switch no. 9 are labeled "N93" and are sent from interface 193.

TABLE 1

An inverse cross-connect reverse notification tree table for Switch no. 3 of FIG. 1.

| A | B | C | D | E | F |
|---|---|---|---|---|---|
| Ingress Label of RNT | Ingress Interface of RNT | Egress Label of RNT | Egress Interface of RNT | Egress Label of RNT | Egress Interface of RNT |
| N43 | I34 | N32 | I23 | N39 | I93 |

The reverse path (upstream) to switch no. 3 from switch no. 4 is labeled N43; the switch no. 3 interface for this data is designated 134. An upstream message received at 134 and that is labeled N43, is sent out from switch no. 3, via the interfaces 123 and 193 and labeled N32 and N39 respectively.

Table 2 shows the egress and interface labels of the working or downstream path from switch no. 3 and the originating switches for that data.

The working path (downstream) path from switch no. 3 is to switch no. 4 and is labeled "L34." The switch no. 3 interface for this data is designated "I34." The data sent downstream from switch no. 3 originates from switch no. 2 and switch no. 9, which are referred to in Table 2 as "Next Hop" switches.

Switch no. 2 originates data to switch no. 3 and that data is received at switch no. 3 on interface "I2." Data from switch no. 9 is received at switch no. 3 at interface "I9." The RNT or upstream notification to switch no. 2 leaves switch no. 3 on its RNT interface "I23." RNT notification to switch no. 9 leaves switch no. 3 from "I93."

TABLE 2

An inverse cross-connect table for a hop-by-hop
reverse notification tree.

| A<br>Egress<br>Label of<br>Working<br>Path | B<br>Egress<br>Interface<br>of Working<br>Path | C<br>Next Hop<br>IP<br>Address<br>of RNT | D<br>Egress<br>Interface<br>of RNT | E<br>Next Hop<br>IP<br>Address<br>of RNT | F<br>Egress<br>Interface<br>of RNT |
|---|---|---|---|---|---|
| L34 | I34 | I2 | I23 | I9 | I93 |

A fault on the link between switch no. 3 and switch no. 4 in the downstream direction can be detected at a downstream node, switch no. 4 perhaps, via either a path failure (PF) or path defect (PD) condition being detected via Link Failure (LF) or Link Defect (LD) signals being propagated to an upstream switch. The downstream node will then periodically transmit fault indication signal (FIS) messages to its upstream neighbor (via the uplink $R_{43}$), which will propagate these further upstream (using its inverse cross-connect table) until they eventually reach the appropriate Protection Switch Element, which will perform the protection switch. From Table 1, messages received at switch no. 3 are labeled "N43." Therefore, in FIG. 1, if link $L_{34}$ has a fault, switch no. 3 will detect the fault via the lost liveness message from switch no. 4 and start transmitting an FIS packet back to switch no. 2 link $L_{23}$ as represented by the message $R_{32}$. From Tables 1 and 2, there are two egress messages and interfaces from switch no. 3, which identify the upstream switches that are to be "notified" of a failure downstream from switch no. 3. (The traffic in the queues of switch no. 3 will continue to be serviced.) By using similar tables, switch no. 2 in turn will propagate the FIS over the RNT back to switch no. 1. The actual protection switch will be performed by switch no. 1, after the receipt of the first FIS. Switch no. 3 will stop transmitting FIS messages "t" time units after the transmission of the first FIS message.

In the preferred embodiment, only one RNT is required for all the working paths that merge (either physically or virtually) to form the multipoint-to-point "forward" or "downstream" path. FIG. 1 shows that at least two (2) working paths (one path of which is comprised of switch elements 1, 2, and 3 that are identified by reference numerals 102, 104, and 106; a second path of which is comprised of switch elements 8, 9, and 3 that are identified by reference numerals 114, 116, and 106) converge at switch element 3 (identified by reference numeral 106). Alternate (and for purposes of claim construction, equivalent) embodiments would include using multiple RNTs for a single working path that has multiple paths that converge at a single node (switches of each path that converges might form different RNTs) as well as using multiple RNTs for a single working path.

The RNT is rooted at an appropriately chosen label switched router ("LSR"), (which hereafter is referred to as an MPLS network switch element) along the common segment of the merged working paths and is terminated at the protection switch elements (PSLs). Intermediate network switching elements on the converged working paths typically share the same RNT reducing signaling overhead associated with recovery. Unlike schemes that treat each network switch element independently, and require signaling between a protection switch element and a destination switch individually for each network switch element, the RNT allows for only one (or a small number of) signaling messages on the shared segments of the label switch paths (LSPs).

The RNT can be implemented either at Layer 3 or at Layer 2 of the OSI, 7-layer protocol stack. In either case, delay along the RNT needs to be carefully controlled. This may be accomplished by giving the highest priority to the fault and repair notification packets, which travel along the RNT. We can therefore have a situation where different protection domains share a common RNT. A protection "domain" is considered to be the switches and links of both a working path and protection path. For example, in FIG. 1, the protection domain bounded 5 by network switch element 1 and network switch element 7, is denoted by {1-2-3-4-6-7, 1-5-7}.

When different protection domains have different RNTs, two cases may arise, depending on whether or not any portions of the two domains overlap, that is, have nodes or links in common. If the protection domains do not overlap, the protection domains are considered to be independent. By virtue of the RNTs in the two domains being different, neither of the working paths nor the RNTs of the two domains can overlap. In other words, failures in one domain do not interact with failures in the other domain. For example, the protection domain defined by {9-3-4-6-7, 9-10-7} is completely independent of the domain defined by {11-13-5-15, 11-13-14-15}. As a result, as long as faults occur in independent domains, the network shown in FIG. 1 can tolerate multiple faults (for example, simultaneous failures on the working path in each domain). If protection domains with disjoint RNTs overlap, it implies that the protection path of one intersects the working path of the other. Therefore, although failures on the working paths of the two domains do not affect one another, failures on the protection path of one may affect the working path of the other and visa versa. For example, the protection domain defined by {1-2-3-4-6-7, 1-5-7} is not independent of the domain defined by {11-13-515, 11-13-14-15} since LSR 5 lies on the protection path in the former domain and on the working path in the latter domain. When protection domains have the same RNT, different failures along the working paths may affect both paths differently. As shown in FIG. 1, for example, working paths 1-2-3-4-5-7 and 9-3-4-6-7 share the same RNT. As a result, for a failure on some segments of the working path, both domains will be affected, resulting in a protection switch in both (for example, the segment 3-4-6-7 in FIG. 1). Likewise, for failures on other segments of the working path, only one domain may be affected (for example, failure on segment 2-3 affects only the first working path 1-2-3-4-6-7, where as failure on the segment 9-3 affects only the second working path 9-3-4-6-7).

There are a number of ways to establish a protection domain, i.e., a working path and a protection path through an MPLS network. Establishing a protection path first requires the identification of the working path (embodied as some series of switches and path links through the MPLS network from a sending node to a destination node). In most cases, the working path and its corresponding recovery path are specified during a network switch path or connection setup procedure, either via a path selection algorithm (running at a centralized location or at an ingress network switch element) or via an administrative configuration (e.g. a manual specification of switches that comprise the protection path).

The specification of either a protection or working path, does not, strictly speaking, require the entire path to be explicitly specified. Rather, it requires only that the head end node or switching node and end or destination switch or node (of the respective paths) be specified. In the absence of a destination switch/node specification, the path egress points out of the MPLS network or domain need to be specified, with the segments between them being "loosely" determined or routed. In other words, a working path would be established between the two nodes at the boundaries of a protection domain via (possibly loose) explicit (or source) routing using LDP/RSVP [label distribution protocol/reservation protocol] signaling (alternatively, via constraint-based routing, or using manual configuration), as set forth more fully below.

Figure 2:
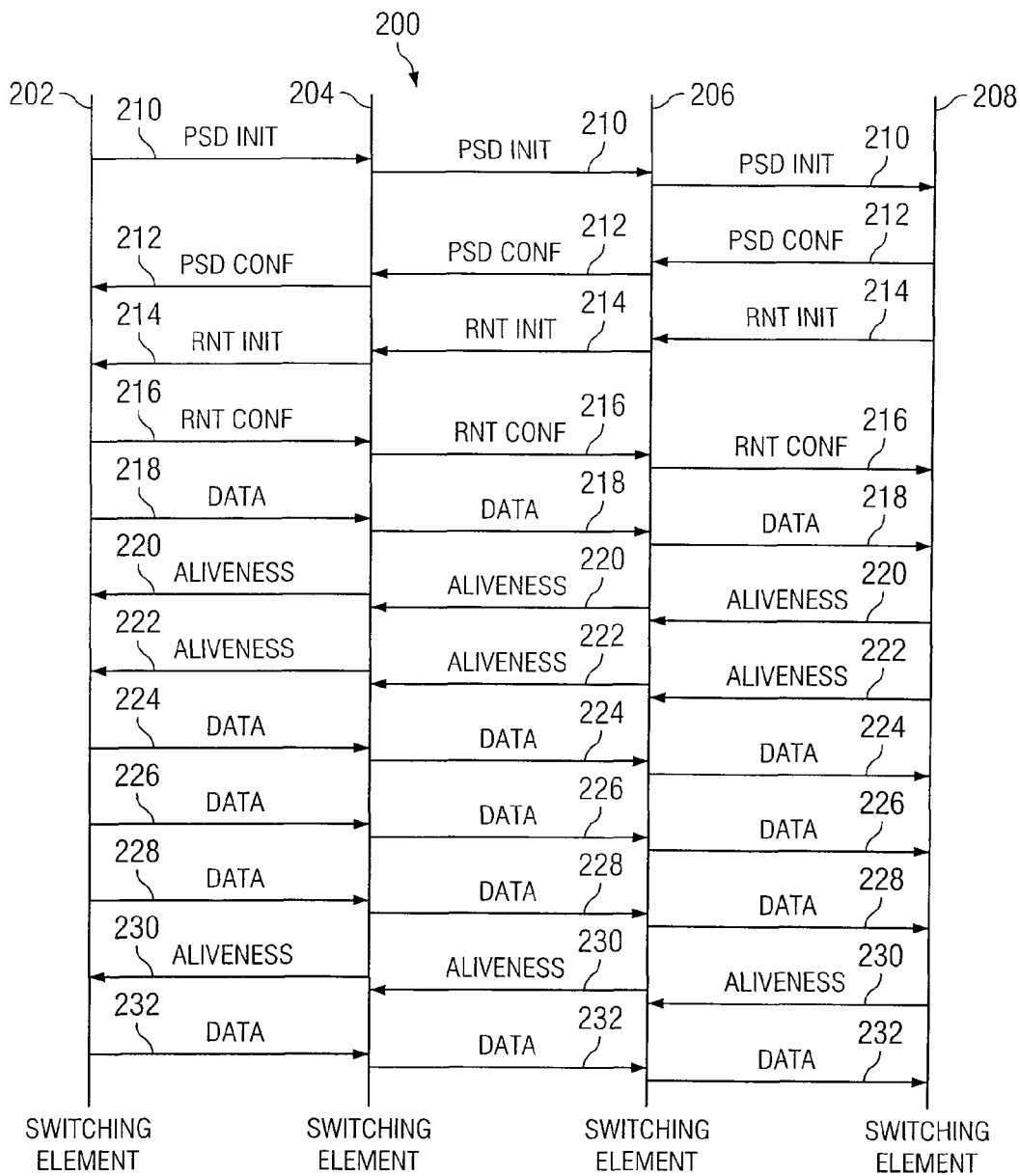
FIG. 2 depicts exemplary message flows in an MPLS network.

FIG. 2 depicts message flows between four (4) different switches of an MPLS network that employs the path protection techniques disclosed herein. Vertical axes of FIG. 2, identified by reference numerals 202, 204, 206, and 208, represent switching elements (shown in FIG. 1) of an MPLS network from which and to which various types of messages are received and sent respectively. Switch 202 is upstream from switches 204, 206, and 208. Switch 204 is upstream from switch 206 as switch 206 is upstream from switch 208.

Protection Path Establishment

A Protection Domain Path is established by the identification of a protection switch or node and an end point switch or node in the MPLS network. The protection switch element ("PSL") initiates the working network switch elements and the recovery network switch element. It is also responsible for storing information about which network switch elements or portions thereof have protection enabled, and for maintaining a binding between outgoing labels specifying the working path and the protection/recovery path. The latter enables the switchover to the recovery path upon the receipt of a protection switch trigger.

A "label distribution protocol" is a set of procedures by which one LSR (i.e., a network switch element) informs another of the label bindings it has made. "Label binding" is a process by which a message to be sent from a source to a destination is associated with various labels between the nodes that lie along the way, between the source and destination. By way of example, in FIG. 1, a message to be sent from switch no. 1 to switch no. 7 is associated or bound to travel to switch no. 7 through switch no. 2 by, or using, the label $L_{12}$ that is first associated with the message at, or by, switch no. 1. Switch no. 2 in turn associates messages labeled $L_{12}$ as bound for switch no. 3 and re-labels them as $L_{23}$. Re-labeling messages (e.g. re-labeling a message received at switch no. 2 on $L_{12}$, as the same message that is output from switch no. 2 but on L23 and which is received at switch no. 3, to be re-labeled by switch no. 3 and output again as $L_{34}$) is known as "label binding." Two or more LSRs, (network switch elements) which use a label distribution protocol to exchange label binding information are known as "label distribution peers" with respect to the binding information they exchange.

The label distribution protocol also encompasses any negotiations in which two, label distribution peers, need to engage in order to learn of each other's MPLS capabilities. This label distribution protocol is referred to as path establishment signaling. MPLS defines two methods for label distribution. These two methods are: Label Distribution Protocol (LDP/CR-LDP) and ReSerVation Protocol (RSVP).

Both LDP/CR-LDP and RSVP allow a path to be setup loosely (wherein each node determines it's next hop) or explicitly (wherein each node has been given it's next hop). These two protocols can be extended, as disclosed herein and by equivalents thereof, to provide a novel mechanism by which protection path establishment can be signaled and created. Accordingly, a "Protection" field can be defined, and added as an extension to the existing label request messages in LDP/CR-LDP, and path message in RSVP protocols. The destination or end point node in the MPLS network participates in setting up a recovery path as a merging network switch element. The destination or end point node learns, during a signaling or working/protection path configuration process, which working and protection paths are merged to the same outgoing network switch element.

Hosts and routers that support both RSVP and Multi-Protocol Label Switching can associate labels with RSVP flows. When MPLS and RSVP are combined, the definition of a flow can be made more flexible. Once a label switched path (LSP) is established, the traffic through the path is defined by the label applied at the ingress node of the LSP (label switched path). The mapping of a label to traffic can be accomplished using a number of different criteria. The set of packets that are assigned the same label value by a specific node are said to belong to the same forwarding equivalence class (FEC) and effectively define the "RSVP flow." When traffic is mapped onto a label-switched path in this way, we call the LSP an "LSP Tunnel". When labels are associated with traffic flows, it becomes possible for a router to identify the appropriate reservation state for a packet based on the packet's label value.

A Path message travels from a sender to receiver(s) along the same path(s) used by the data packets. The IP source address of a Path message must be an address of the sender it describes, while the destination address must be the DestAddress for the session. These addresses assure that the message will be correctly routed through a non-RSVP cloud.

The format of an exemplary RSVP message with the Protection Object extension is:

```
<Path Message> ::= <Common Header> [ <INTEGRITY> ]
    <SESSION> <RSVP_HOP>
    [ <TIME_VALUES> ]
    [ <EXPLICIT_ROUTE> ]
        [ <PROTECTION> ]     /*The new message field.*/
    <LABEL_REQUEST>
    [ <SESSION_ATTRIBUTE> ]
    [ <POLICY_DATA> . . . ]
    <sender descriptor>
```

Label Distribution Protocol (LDP) is defined for distribution of labels inside one MPLS domain. One of the most important services that may be offered using MPLS in general, and LDP in particular, is support for constraint-based routing of traffic across the routed network. Constraint-based routing offers the opportunity to extend the information used to setup paths beyond what is available for the routing protocol. For instance, an LSP can be setup based on explicit route constraints, QoS constraints, and other constraints.

Constraint-based routing (CR) is a mechanism used to meet Traffic Engineering. These requirements may be met by extending LDP for support of constraint-based routed label switched paths (CR-LSPs).

The Path Vector TLV is used with the Hop Count TLV in Label Request and Label Mapping messages to implement the optional LDP loop detection mechanism. Its use in the Label Request message records the path of LSRs the request has traversed. Its use in the Label Mapping message records the path of LSRs a label advertisement has traversed to setup an LSP.

The format of an exemplary CR-LDP message with the Protection TLV extension is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0| Label Request (0x0401)      | Message Length              |
+-+-+-+-+-+-+-+-+-+-+-+-+-+-+-+-+-+-+-+-+-+-+-+-+-+-+-+-+-+-+-+-+
|       Message ID                                             |
+-+-+-+-+-+-+-+-+-+-+-+-+-+-+-+-+-+-+-+-+-+-+-+-+-+-+-+-+-+-+-+-+
|       FEC TLV                                                |
+-+-+-+-+-+-+-+-+-+-+-+-+-+-+-+-+-+-+-+-+-+-+-+-+-+-+-+-+-+-+-+-+
|       LSPID TLV          (CR-LDP, mandatory)    |
+-+-+-+-+-+-+-+-+-+-+-+-+-+-+-+-+-+-+-+-+-+-+-+-+-+-+-+-+-+-+-+-+
|       ER-TLV             (CR-LDP, optional) |
+-+-+-+-+-+-+-+-+-+-+-+-+-+-+-+-+-+-+-+-+-+-+-+-+-+-+-+-+-+-+-+-+
|       Protection TLV        (CR-LDP, optional) |
+-+-+-+-+-+-+-+-+-+-+-+-+-+-+-+-+-+-+-+-+-+-+-+-+-+-+-+-+-+-+-+-+
|       Traffic TLV       (CR-LDP, optional) |
+-+-+-+-+-+-+-+-+-+-+-+-+-+-+-+-+-+-+-+-+-+-+-+-+-+-+-+-+-+-+-+-+
|       Pinning TLV       (CR-LDP, optional) |
+-+-+-+-+-+-+-+-+-+-+-+-+-+-+-+-+-+-+-+-+-+-+-+-+-+-+-+-+-+-+-+-+
|       Resource Class TLV     (CR-LDP, optional) |
+-+-+-+-+-+-+-+-+-+-+-+-+-+-+-+-+-+-+-+-+-+-+-+-+-+-+-+-+-+-+-+-+
|       Pre-emption TLV        (CR-LDP, optional) |
+-+-+-+-+-+-+-+-+-+-+-+-+-+-+-+-+-+-+-+-+-+-+-+-+-+-+-+-+-+-+-+-+
```

Wherein the "Protection TLV" message field is new.

The Protection Object (RSVP)/Protection Type Length Value (TLV) (LDP/CRLDP) establishes the working and a corresponding protection path utilizing the Reservation Protocol (RSVP) path message or the Constraint-Based Routing Label Distribution Protocol (CR-LDP) Label Request message. The attributes required to establish the Protection Domain are:

1 Priority: Specifies whether this protection group is a high or low switching priority.

2 Protection ID: Specifies whether protection is supported.

3 Protection Type: Specifies whether this establishment is for the Protection, or Working Path.

4 Protection Identity: Specifies a unique identifier for the protection traffic.

5 Node Identity: Specifies whether the node is a switching, merging, or RNT root node.

6 RNT Type: Specifies whether the RNT is created using Hop-by-hop, MPLS LSP, or SONET K1/K2.

7 Timer Options: Specifies the hold off and notification time requirements.

8 Recovery Option: Specifies whether the recovery is revertive and if the action is Wait, Switch Back, or Switchover.

9 Protection Bandwidth: Specifies whether the bandwidth of the protection path is available to carry excess (preemptable) traffic.

The following table illustrates the structure of an exemplary Protection 15 Object/Protection TLV Structure.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|P|D|T|  PGID       |NID|RNTT| TO  | RO |B| RESVD            |
+-+-+-+-+-+-+-+-+-+-+-+-+-+-+-+-+-+-+-+-+-+-+-+-+-+-+-+-+-+-+-+-+
```

P = Priority
D = Protection ID 25
T = Protection Type
PGID = Protection path Identity
NID = Node Identity
RNTT = RNT Type
TO = Timer Options
RO = Recovery Option
B = Protection Bandwidth
RESVD = Reserved for Future Use Since the switching systems used in the network 100 are unidirectional, and pathway fault recovery requires the notification of faults to a protection switch, such as switch no. 1 or switch no. 9, responsible for a switchover to a recovery path, a mechanism is provided for the fault indication and the fault recovery notification to travel from a point of occurrence of the fault back to the protection switch. The ability to propagate a fault notice upstream however is complicated when two or more data streams merge in a single switch such as the streams from switch no. 9 and switch no. 2 merging at switch no. 3. When two or more data streams merge at a switch, e.g. switch no. 9, a fault anywhere downstream from switch no. 9 will require that a fault notice be sent to multiple source switches, i.e. switch no. 9 and switch no. 2. The fault indication and recovery notification should be able to travel along a reverse path of the working paths to all the protection switch elements that might be affected by the fault. The path is provided by the reverse notification tree.

The MPLS protection switch message sequence begins with the establishment of the particular working paths and protection paths through the network. The establishment of the working path and protection path is accomplished by the transmission of a Protection Switch Domain (PSD) initialization message 210 from a switch 202 to switches 204, 206, and 208. A PSD confirmation message 212 is propagated from the downstream switch 208 upstream to switch 202.

The Reverse Notification Tree, or RNT, is established by the downstream switch 208 sending an RNT initialization message 214 upstream to switches 206, 204, and 202. Confirmation of the RNT setup is accomplished by the RNT Confirmation message 216 that originates from switch 202. Upon the establishment of the working and protection paths, and the reverse notification tree, data 218 can be sent through the network.

Two "aliveness" messages 220 and 222, which provide notification of the working path status, are shown in FIG. 2 to depict the fact that the aliveness message described above can be sent periodically, regardless of whether downstream data 218 was sent. As shown further, downstream data transmissions, such as transmissions 224, 226 and 228 are not conditioned upon receipt of an aliveness message in any fixed way. An aliveness message 230 sent upstream is then followed by yet another data transmission 232.

FIG. 2 shows that the sequence of aliveness messages and data transmissions do not need to follow any sort of predetermined or fixed order. For network reliability purposes, the aliveness messages are preferably sent periodically, so that their absence can be detected if they do not arrive on time. Alternate embodiments include sending liveness messages a periodically.

Those skilled in the art will recognize that re-routing data on a either the failure of a link or a switch in a network such as that depicted in FIG. 1 need not be performed by a protection switch. In the event that switch no. 4 fails for example switch no. 3 might reroute data from switch no. 2 that is destined for switch no. 7, through another protection switch element 9, identified by reference numeral 116. Switch no. 9 might then reroute data from switch no. 2 that is addressed to switch no. 7 over a protection path designed as P9, 10 and P10, 7 through switch no. 10, identified as reference numeral 118.

In the preferred embodiment, the media over which data message are carried might be twisted copper wires, coax cable, fiber optic cable or even a radio frequency data link. As set forth above, each of the switching systems might accommodate a variety of packetized data messages including but not limited to Ethernet, internet protocol, ATM, frame relay or other types of transmission switching systems.

By continuously sending an upstream message indicating that downstream traffic arrives at its destination, recovery time required to recover from the fault of a media link or a switching system can be minimized. If the switch status message used to indicate a functionality of a switch or a link is sent promptly enough, and to the appropriate node in a mesh network such as that shown in FIG. 1, the time required to reroute data messages between first and second endpoint switches over an alternate data path can be minimized. In the preferred embodiment, the alternate or so called protection path is preferably set up in advance and maintained in a stand by mode such that it is immediately available when required by the protection switch that will reroute data over the protection path.

What is claimed is:

1. A method for routing a message in a network between a first data switch and a second data switch, comprising:
    establishing a downstream working path for data traffic, the downstream working path including a protection switch and one or more destination switches, the first and second data switches being between the protection switch and the destination switches or operable to serve as one of the protection or destination switches in the downstream working path;
    establishing an upstream reverse notification path associated with the downstream working path for signal traffic from the one or more destination switches to the protection switch;
    routing the message from the second data switch to the first data switch via the upstream reverse notification path, the message providing a fault status indication for the downstream working path.

2. The method of claim 1, wherein the upstream reverse notification path is established co-incident with the downstream working path through the network.

3. The method of claim 1, wherein the upstream reverse notification path is established through one or more data switches that are not part of the downstream working path.

4. The method of claim 1 wherein the upstream reverse notification path is established with a topology represented by a directed acyclical graph.

5. The method of claim 1, further comprising:
    identifying an indication at the second data switch that a fault has occurred in the downstream working path downstream of the second data switch;
    inhibiting the routing of the message at the second data switch on the upstream reverse notification path in response to the indication.

6. The method of claim 5, further comprising:
    initiating re-routing of the data traffic away from the downstream working path in response to inhibiting the routing of the message.

7. The method of claim 5, wherein the indication is identified in response to not receiving a status message from a data switch downstream of the second data switch on the upstream reverse notification path.

8. The method of claim 1, further comprising:
    identifying an indication at the second data switch that a fault has occurred in the downstream working path downstream of the second data switch;
    generating an error message at the second data switch in response to the indication.

9. The method of claim 8, further comprising:
    forwarding the error message to the first data switch on the upstream reverse notification path.

10. The method of claim 8, further comprising:
forwarding the message to the protection switch on the upstream reverse notification path, the protection switch operable to re-route the data traffic away from the downstream working path.

11. A reverse notification network in a multi-protocol label switching (MPLS) network, comprising:
a downstream switching system operable to receive downstream data along a working path;
an upstream switching system operable to provide the downstream data to the downstream switching system over the working path, the upstream switching system being between one or more destination switching systems and a protection switching system in the working path or operable to serve as the protection switching system in the working path;
an upstream data link operable to couple the downstream switching system to the upstream switching system, the upstream data link being part of an upstream reverse notification path established by and from the one or more destination switching systems to the protection switching system in the working path, the upstream data link operable to send an upstream reverse notification message from the downstream switching system to the upstream switching system, the upstream reverse notification message providing a fault status for the working path.

12. The reverse notification network of claim 11, wherein the upstream reverse notification path is coincident with the working path.

13. The reverse notification network of claim 11, wherein the downstream switching system maintains a table identifying other upstream switching systems including the upstream switching system.

14. The reverse notification network of claim 11, wherein the downstream switching system is operable to identify an indication that a fault has occurred in the working path, the downstream switching system operable to inhibit the sending of the upstream reverse notification message to the upstream switching system in response to the indication.

15. The reverse notification network of claim 14, wherein the upstream switching system is operable to initiate re-routing of the data traffic away from the working path in response to inhibiting of the sending of the upstream reverse notification message.

16. A system for routing a message in a network between a first data switch and a second data switch, comprising:
means for establishing a downstream working path for data traffic, the downstream working path including a protection switch and one or more destination switches, the first and second data switches being between the protection switch and the destination switches or operable to serve as one of the protection or destination switches in the downstream working path;
means for establishing an upstream reverse notification path associated with the downstream working path for signal traffic from the one or more destination switches to the protection switch;
means for routing the message from the second data switch to the first data switch via the upstream reverse notification path, the message providing a fault status indication for the downstream working path.

17. The system of claim 16, further comprising:
means for identifying an indication at the second data switch that a fault has occurred in the downstream working path downstream of the second data switch;
means for inhibiting the routing of the message at the second data switch on the upstream reverse notification path in response to the indication.

18. The system of claim 17, further comprising:
means for initiating re-routing of the data traffic away from the downstream working path in response to inhibiting the routing of the message.

19. The system of claim 17, wherein the indication is identified in response to not receiving a status message from a data switch downstream of the second data switch on the upstream reverse notification path.

20. The system of claim 16, further comprising:
means for identifying an indication at the second data switch that a fault has occurred in the downstream working path downstream of the second data switch;
means for generating an error message at the second data switch in response to the indication.

* * * * *